United States Patent

Rohrbach et al.

[19]

[11] Patent Number: 5,891,221

[45] Date of Patent: Apr. 6, 1999

[54] CHEMICAL REAGENT PACKAGE AND METHOD OF OPERATION EFFECTIVE AT REMOVING A WIDE RANGE OF ODORS

[75] Inventors: Ronald Rohrbach, Flemington; Peter Unger, Convent Station; Daniel Bause, Flanders; Lixin Xue, Morristown, all of N.J.; Gordon Jones, Toledo, Ohio; Russell Dondero, North Arlington, N.J.

[73] Assignee: AlliedSignal Inc., Morristown, N.J.

[21] Appl. No.: 955,843

[22] Filed: Oct. 21, 1997

Related U.S. Application Data

[63] Continuation-in-part of Ser. No. 736,308, Oct. 24, 1996, Pat. No. 5,713,971, which is a continuation of Ser. No. 363,500, Dec. 23, 1994, abandoned.

[51] Int. Cl.⁶ .................................................. B01D 47/14
[52] U.S. Cl. ........................... 95/159; 95/211; 96/296; 261/104; 261/107
[58] Field of Search .................... 261/80, 94, 99, 261/104, 107, DIG. 17, DIG. 65; 55/302, 303, DIG. 5; 96/290, 294, 286, 181, 143, 144, 274, 276, 123, 124; 95/210–212, 159, 170, 171; 428/397, 398; 264/241, 259, 271.1, 273, 257, 279, 279.1, DIG. 48

[56] References Cited

U.S. PATENT DOCUMENTS

| | | | |
|---|---|---|---|
| 1,273,682 | 7/1918 | Slater et al. | 261/104 |
| 2,085,390 | 6/1937 | Quinlivan | 261/104 |
| 2,603,468 | 7/1952 | Sutton | 261/104 |
| 2,653,017 | 9/1953 | Frost | 261/104 X |
| 3,505,175 | 4/1970 | Zalles | 261/80 X |
| 3,754,377 | 8/1973 | Clonts | 95/211 |
| 3,888,955 | 6/1975 | Maruko | 261/104 X |
| 3,991,724 | 11/1976 | Geiser | 261/99 X |
| 4,031,180 | 6/1977 | Bohanon | 261/106 |
| 4,086,305 | 4/1978 | Dobritz | 261/104 X |
| 4,098,852 | 7/1978 | Christen et al. | 261/104 |
| 4,102,656 | 7/1978 | Koritz | 261/107 X |
| 4,130,487 | 12/1978 | Hunter et al. | 55/521 X |
| 4,166,087 | 8/1979 | Cline et al. | 261/DIG. 17 |
| 4,300,925 | 11/1981 | Nikandrov et al. | 96/130 |
| 4,323,373 | 4/1982 | Fritz | 95/281 |
| 4,578,091 | 3/1986 | Borja | 95/214 |
| 4,774,032 | 9/1988 | Coates et al. | 261/104 |
| 4,938,787 | 7/1990 | Simmeriein-Erlbacher | 96/298 |
| 4,976,113 | 12/1990 | Gershuni et al. | 261/104 X |
| 5,024,686 | 6/1991 | Lerner | 96/361 |
| 5,057,368 | 10/1991 | Largman et al. | 428/397 |
| 5,110,325 | 5/1992 | Lerner | 95/213 |
| 5,310,416 | 5/1994 | Borger et al. | 95/64 |
| 5,318,731 | 6/1994 | Yokoya et al. | 261/104 |
| 5,472,613 | 12/1995 | Schofield | 210/634 |
| 5,704,966 | 1/1998 | Rohrbach et al. | 95/170 |
| 5,713,971 | 2/1998 | Rohrbach et al. | 261/104 X |

FOREIGN PATENT DOCUMENTS

0600331A1  6/1994  European Pat. Off. .

*Primary Examiner*—Richard L. Chiesa

[57] ABSTRACT

A unique odor filtration device (10) which continuously removes odor causing gas phase contaminants from an air stream through the use of partially hollow wicking fibers (20) impregnated with a selected liquid (18) which can capture odor causing gas phase contaminants. The odor removing liquid (18) is a chemical composition including sodium permanganate in combination with either sodium carbonate or sodium phosphate. The odor absorbing liquid (18) can include specialized additives such as transition metal salts and other agents such as sodium iodide for additional and broader odor removal coverage. The wicking fibers (20) are formed into a filter element (12) which extends from a chamber (16) through which the air stream to be cleaned is directed into a stripping chamber (19). The odor causing contaminants are conveyed to from chamber (16) to chamber (19) by a concentration factor induced molecular migration. The wicking fibers (20) include internal longitudinal cavities (22) each with a relatively small longitudinal extending opening (24). The wicking fibers (20) are filled with the selected contaminant removing liquid through capillary action by which the individual wicking fibers (20) rapidly draw the selected liquid, with which they come into contact, through the internal cavities (22). The absorption liquid (18) remains within the wicking fiber cavities (22) and generally does not enter the space between the wicking fibers yet through the longitudinal openings (24) the liquid is in full communication with the air stream flowing past the fibers (20).

20 Claims, 10 Drawing Sheets

CHEMICAL REAGENT PACKAGE AND METHOD OF OPERATION EFFECTIVE AT REMOVING A WIDE RANGE OF ODORS

CROSS-REFERENCE TO RELATED APPLICATIONS

This application is a continuation-in-part of copending U.S. patent application Ser. No. 08/736,308, filed on Oct. 24, 1996, now U.S. Pat. No. 5,713,917, which is a continuation of Ser. No. 08/363,500 titled "Filtration Device Using Absorption for the Removal of Gas Phase Contaminants" filed Dec. 23, 1994, now abandoned, and assigned to the assignee of the present application.

BACKGROUND OF THE INVENTION

1. Field of the Invention

This invention relates to an air cleaning system and more particularly to an odor removal system using wicking fibers incorporating a liquid based chemical reagent package.

2. Description of Prior Art

An example of an adsorptive technique for the removal of odors is the use of activated charcoal as an odor removing element in a device to purify an air stream. Conventional carbon adsorbents have a broad range of effectiveness against odors. However, such activated carbon adsorptive techniques of removing odor from an air stream are effective only for a relatively short time period, are relatively inefficient at low odor concentration levels, have performance which declines rapidly at higher relative humidities, and frequently result in a relatively high pressure differential across the activated carbon filter element. As a result relatively large quantities of activated carbon are required in such filter devices, however, even with the larger amount of activated carbon the relatively large pressure differential problem will still remain. These prior devices are usually operated mechanical on a cyclic bases.

It is desirable to provide a compact, economical air filter for the continuous removal of odors which avoids the problems of reduced flow rates, reduced efficiency at high humidities, and reduced removal efficiency over time.

SUMMARY OF THE INVENTION

The present invention provides an unique filtration device which continuously removes odor contaminants from an air stream through the use of a wicking fiber material containing a selected chemical reagent package effective at removing a wide range of odors and which has superior performance at higher humidities. The basic reagent package contains sodium permanganate in combination with sodium carbonate or sodium phosphate into which other reagents can be added for additional odor removal capabilities.

Wicking fibers have the ability to carry a liquid along their surface and to retain the liquid so it is not easily dislodged. Wicking fibers such as those disclosed in U.S. Pat. No. 5,057,368 are very small and well suited to the practice of the present invention. These generally hollow wicking fibers include internal longitudinal cavities each with a relatively small longitudinal opening extending to their outer surface. Through capillary action the individual wicking fibers rapidly draw the selected liquid, with which it comes into contact, through the internal cavities. The absorption liquid remains within the wicking fiber cavities and generally does not enter the space between the wicking fibers yet through the longitudinal openings the liquid is in communication with the air stream flowing past the wicking fibers.

Undesirable odors and toxic gas molecules are removed from the air stream by interposing a plurality of the wicking fibers which include in their internal cavities the disclosed chemical reagent liquid package which has an affinity for the undesired odor and gas molecules. The longitudinal extending openings in the wicking fibers permit the liquid retained in the wicking fiber cavities to interact with the gas molecules within the air stream so as to absorb the unwanted odor and gas molecules. A concentration factor induced molecular migration effectively conveys the undesirable odor molecules within the liquid away from the air stream to be cleaned, setting up a steady state concentration gradient with new odor and/or toxic gas molecules continuously being absorbed.

This invention can be use in a customized fashion to remove specific odors and toxic gases. Since this filter does not rely on adsorption, wherein particles to be removed attach to the surface of the filter material elements, but rather absorption, molecular motion mobility can be harnessed to move unwanted gases from one zone to another in a nonmechanical manner. In the disclosed device the open space between the wicking fibers remain so that, in the air stream to be cleaned, the pressure differential problem is minimized and air flow restrictions are not increased by continuous use of the chemical reagent liquid package and the odor vapors which are absorbed. A device according to the present invention provides for nonmechanical and continuous noncyclic regeneration or cleaning of a gas stream.

BRIEF DESCRIPTION OF DRAWINGS

For a better understanding of the invention reference may be had to the preferred embodiments exemplary of the inventions shown in the accompanying drawings in which.

DETAILED DESCRIPTION OF THE PREFERRED EMBODIMENTS

Figure 1:
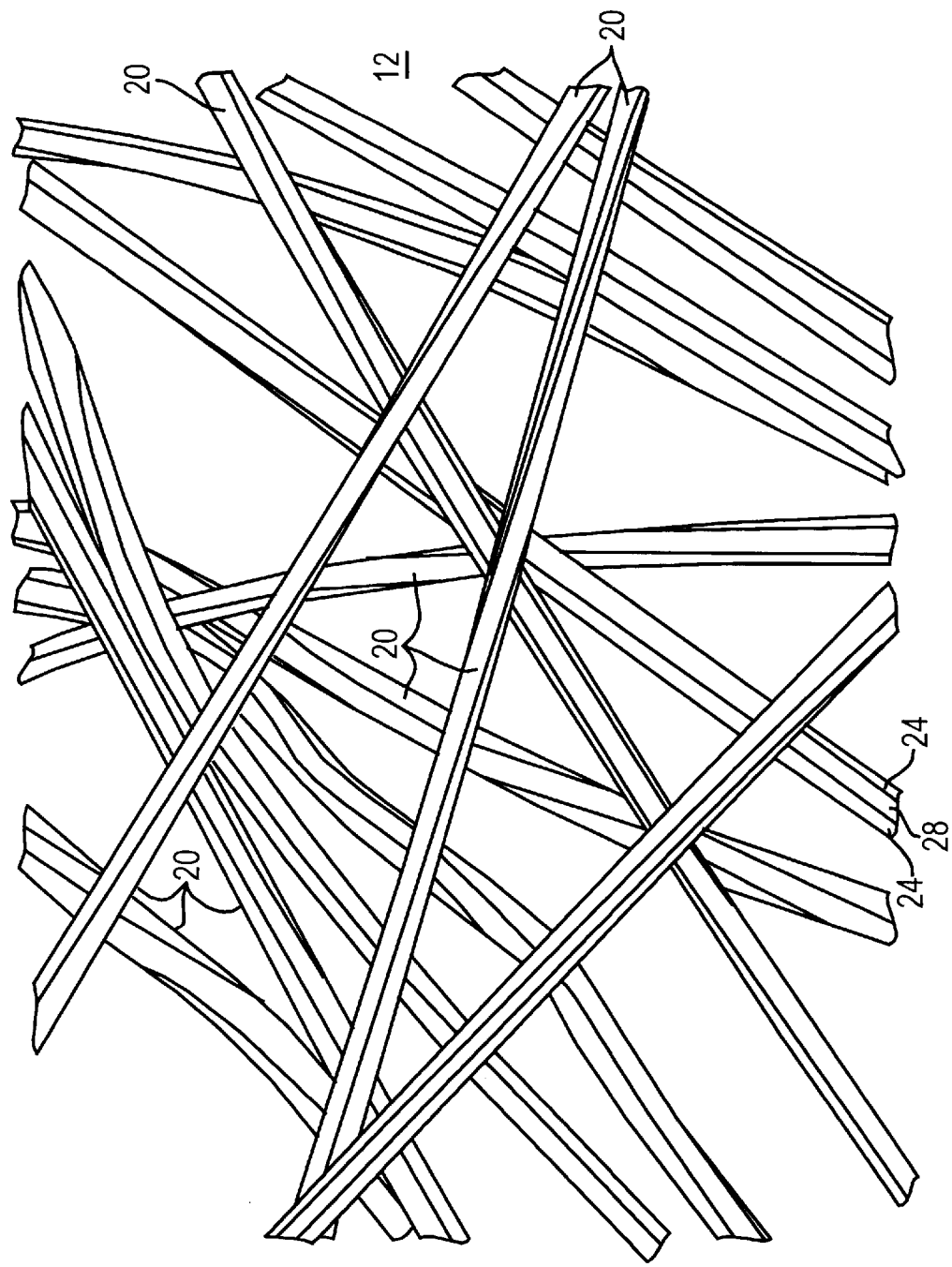
FIG. 1 is an enlarged view of a portion of a filter mat made of wicking fibers which are particularly suitable for practicing the present invention.
Figure 2:
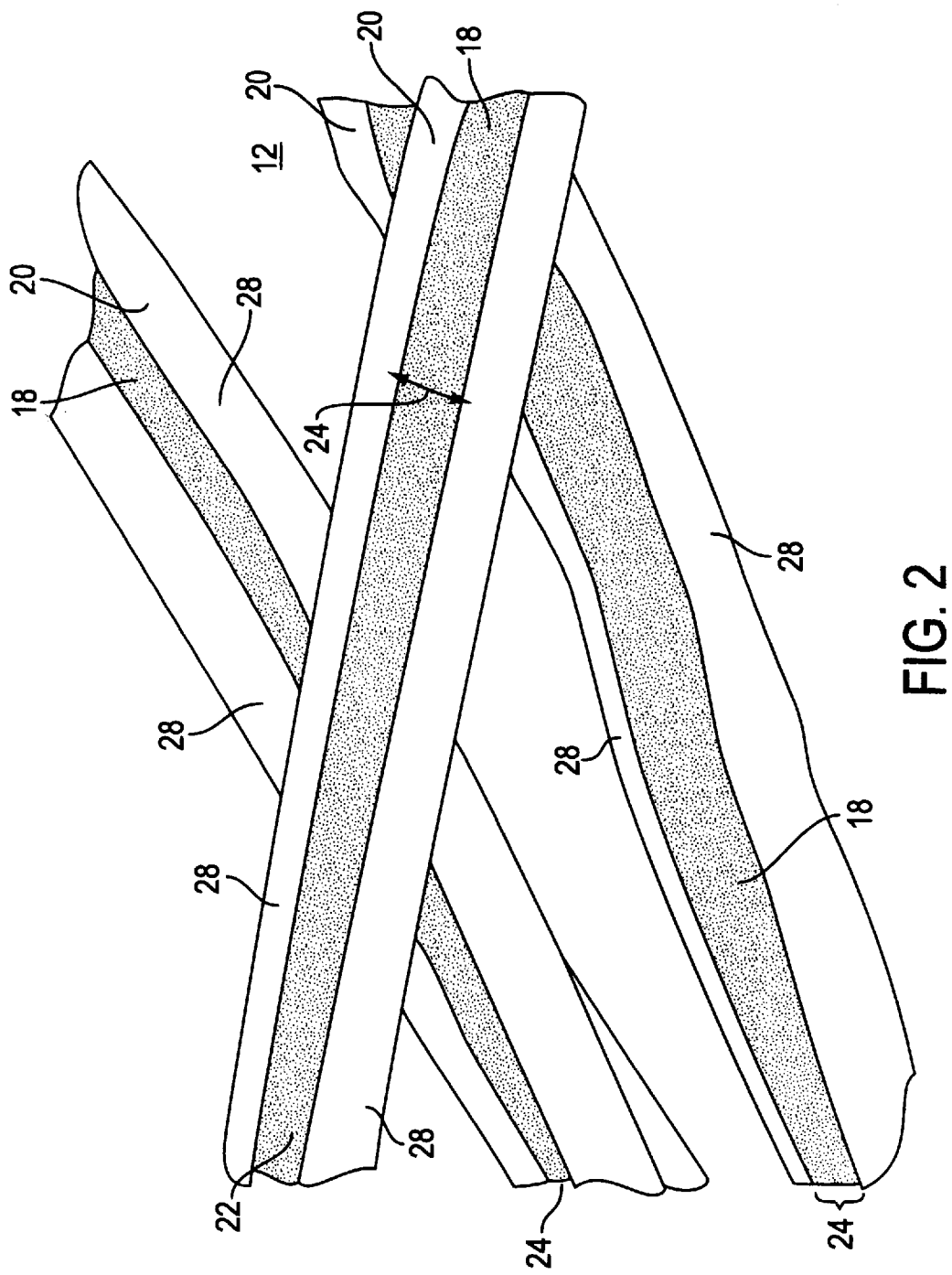
FIG. 2 is an enlarged view of several of the elongated wicking fibers shown in FIG. 1 showing the liquid extractant within the longitudinally extending fiber cavities.
Figure 5:
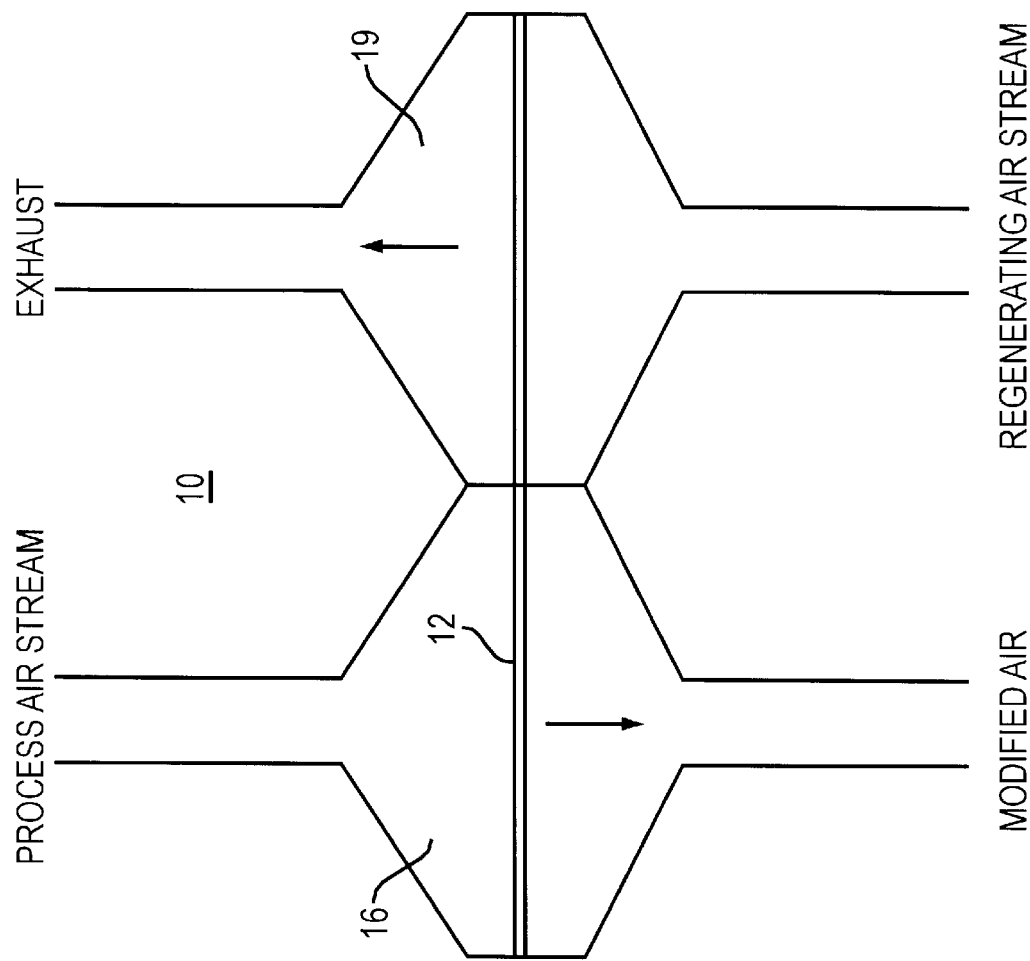
FIG. 5 is a diagrammatic illustration of an odor removal device according to the present invention.

Referring now to the drawings and FIGS. 1, 2 and 5 in particular there is shown a continuous odor removal system 10 according to the present invention. Odor removal system 10 utilizes a filter element 12 formed from numerous wicking fibers 20, of the type shown in FIG. 3, containing an odor absorbing chemical reagent liquid 18 according to the invention.

The odor absorbing liquid 18 contains sodium permanganate in combination with sodium carbonate or sodium phosphate into which other reagents can be added for additional odor removal capabilities. The absorbing liquid 18 which has an affinity for specific odors is selected and disposed within internal channels or cavities 22 formed in the individual wicking fibers 20. The liquid media 18 selected uses absorption rather than adsorption as its mechanism to decontaminate or purify the air stream. The absorption liquids 18 used are selected to absorb the odor vapors of interest. The chemical reagent liquid 18 should be capable of lightly absorbing a particular odor molecule in a reversible manner so that it can be easily stripped off.

Figure 3:
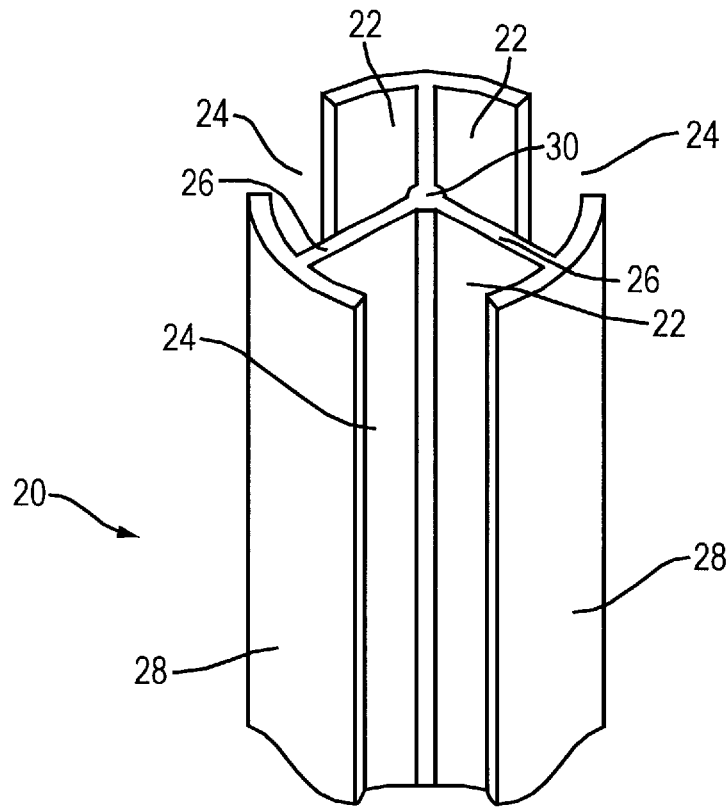
FIG. 3 is an enlarged view of a wicking fiber which is particularly suitable for practicing the present invention.
Figure 4:
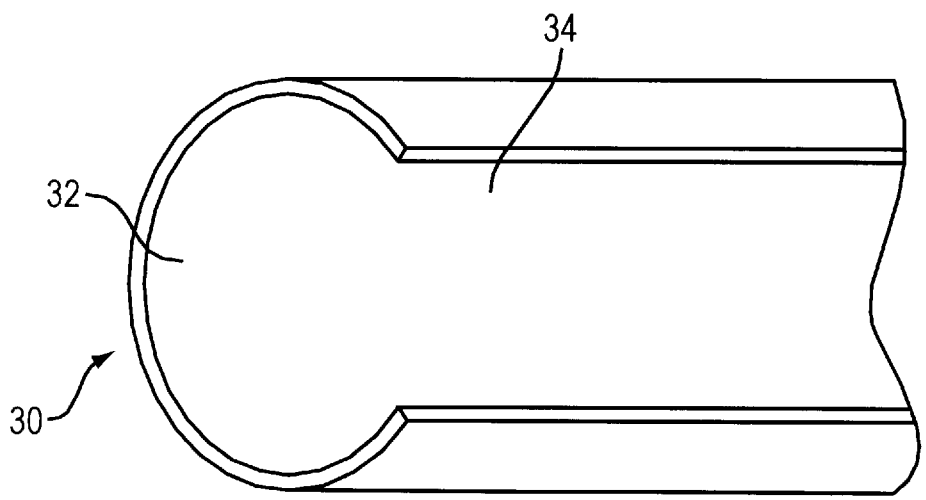
FIG. 4 is an enlarged view of another wicking fiber which can also be used for practicing the present invention.

A wicking fiber which is particularly suitable for practicing this invention is disclosed in U.S. Pat. No. 5,057,368. This patent discloses a trilobal or quadrilobal fiber formed from thermoplastic polymers wherein the fiber has a cross-section with a central core and three or four T-shaped lobes 26. The legs of the lobes intersect at the core so that the angle between the legs of adjacent lobes is from about 80 degrees to 130 degrees. The thermoplastic polymer is typically a polyamide, a polyester, a polyolefin or a combination thereof. The wicking fiber as illustrated in FIG. 3 is formed as an extruded strand having three hollow interior longitudinally extending cavities 22 each of which communicates with the outer strand surface by way of longitudinal extending slots 24. The wicking fibers 20 are relatively small having a diameter of 30 to 250 microns. The capillary forces within the individual cavities 22 are so much greater than those external to the fiber 20 that the absorptive liquid is readily wicked up the interior of the fiber 20 without appreciable wetting of the external surfaces 28 or filling the inter fiber voids. The fibers 20 strongly retain the liquid through capillary action so that the fiber mat 12 is not wet to the touch and the liquid will not shake off. In a filter mat 12 of such wicking fibers 20 the area between the individual strands remains relatively free of the gas absorbing liquid 18 with which the internal cavities 22 of each fiber 20 are filled. The filter element may be made of one or more type of wicking material strands such as a polyamide, polyester, or polyolefins. The three T-Shaped cross-section segments may have their outer surface 28 curved, as shown, or straight. While the wicking fiber 20 is depicted as three lobed other number of lobes are suitable. In addition other internal wicking fibers may be used. A C-shaped fiber 30, as shown in FIG. 4, or other cross sections may also be suitable for wicking the odor extracting liquid. The C-shaped fiber 30 includes an internal longitudinally extending channel 32 which is connected to the outer surface by a longitudinally extending slot or opening 34. The odor extracting liquid 18 is held by capillary force within the longitudinally channels 32 and only comes into contact with the odor contaminated air stream along the longitudinally extending openings 34. The odor contaminated air stream is directed over the filters 12 formed from the wicking fibers 20, 30 into contact with the odor extracting liquid 18 and the contaminating odor vapors are absorbed into the odor extracting liquid 18 through the openings 18, 34.

The specific shape of the wicking fibers is not important so long as the fibers selected can move the absorption liquid 18, with which it comes into contact, along its surface and then hold the absorption liquid 18 to its surface so that it is not easily displaced.

Many common materials which are effective wicking agents may restrict circulation of air through the material. For example, wetting a common handkerchief with water essentially seals the material against air flow there through. By using internal wicking fibers where the odor absorbing liquid is maintained within the cavities 22 of fiber 20 unrestricted air flow about the outside of the individual wicking fibers 20 is maintained.

Referring now to FIG. 5 there is shown a diagrammatic illustration of an odor removal device 10 according to the present invention. Device 10 includes a filter 12 formed of fibers 20 with an odor extracting liquid 18 disposed in the channels 22. The disclosed odor removal system 10 includes an odor removal chamber 16 and a stripping or cleaning chamber 19. The fiber mesh or filter element 12 consists of numerous wicking fibers 20 disposed and oriented to extend within both chambers 16, 19. A housing (not shown) can be formed around the outside of the device 10. The odor removal system 10 is constructed so that the two chambers 16, 19 are separate. A partition within device 10 separates chamber 16 from chamber 19. The odor contaminated air stream to be cleaned enters chamber 16 and is directed through the portion of the impregnated fiber mesh 12 which is disposed across chamber 16. All of the odor contaminated air stream through chamber 16 must flow through the wicking fiber mesh 12. Fiber mesh 12 is constructed with many wicking fibers 20 impregnated with the odor extracting liquid 18 and has sufficient thickness so that the entire air stream flowing through chamber 16 comes into intimate contact with the selected liquid 18 within the cavities 22 of the wicking fibers 20. The selected liquid 18 which has an affinity for the undesired odor molecules absorbs the odor molecules and thus removes them from the contaminated air stream flowing through chamber 16.

The wicking fibers 20, containing the liquid 18 with the absorbed unwanted odor molecules, extends into a stripping or cleaning chamber 19 wherein a regenerating air stream passes over the wicking fibers 20 and strips and carries away the unwanted odor molecules. A concentration factor induced molecular migration effectively conveys the undesirable molecules within the liquid 18 from the air stream to be cleaned within chamber 16 into the stripping air stream flowing through chamber 19. The stripping air stream may be heated or otherwise modified to facilitate removal of the undesirable odor causing molecules. The direction of flow of the air streams flowing through chambers 16 and 19 is not important. The size of chambers 16 and 19 and the flow rates of the air streams can be designed to suit a particular application. The selected liquid 18 acts as a shuttling carrier capable of transporting gases across the partition to the stripping chamber 19 and returning again via the generally parallel arrangement of fibers 20. A concentration factor induced molecular migration effectively conveys the undesirable odor causing molecules within the liquid odor extractant 18 away from the contaminated air stream to be cleaned in chamber 16, setting up a steady state concentration gradient with new odor molecules continuously being absorbed within the supported liquid odor extractant 18.

The present invention teaches a chemisorptive reagent package which is particularly suitable for the use as the liquid extrant 18. The chemical reagent package which we discovered for the liquid extrant 18 has the required combination of properties of: 1) broad chemical reactivity, 2) rapid kinetics, and 3) good stability of reagents. The reagent package strategy taken consisted of a chemical cocktail which had the following properties: 1) high alkalinity, 2) high water holding properties and 3) a strong oxidation potential. In this application there must be an economy and mutual compatibility of reagents and they must posses a high degree of synergy. This requires a thoughtful formulation of components.

Of the strong oxidizing agents which are of potential use; sodium hypochlorite, hydrogen peroxide and sodium permanganate, the permanganate ion has the most rapid reaction kinetics and broadest reaction profile for inorganic and organic moieties of the above oxidants. Permanganate ion has long been used in odor removal in liquid scrubber applications and in a dry supported forms. It has a history of demonstrated performance for a wide range of odors. Permanganate ion is a strong oxidizing agent capable of reacting with aldehydes, reduced sulfur compounds, unsaturated hydrocarbons, alcohols, phenols, amines, hydrogen sulfide and sulfur dioxide.

Most oxidizing agents, such as permanganate, must be in the soluble aqueous form in order to achieve maximum reaction rates based on their mechanism of action. It was important to develop a formulation in which this environment was favored. A reagent package was developed in which the components had a high deliquescent property over a wide operating relative humidity range. Potassium permanganate has had a long history of use in both odor control solid phase applications as well as in liquid scrubber systems. We have tried to take all the advantage of the liquid scrubber applications with the most rigorous and rapid intrinsic kinetics available with permanganate by using a very hygroscopic form of the permanganate ion. This was done by employing the sodium salt of permanganate. The traditional potassium salt of permanganate has a solubility of 6.3% (wt/v) while the sodium salt is so soluble and hygroscopic it is too high to be measured accurately. This exceedingly high solubility and deliquescent nature allows the sodium permanganate to be in an aqueous environment over a wide range of humidities below 50% RH.

It is well known that the oxidation with permanganate ion is very sensitive to pH depending upon the substrate to be oxidized. It has been generally found that the oxidization of many organic compounds is accelerated by higher alkalinity when the pH exceeds 11. We found that this also held for the reporter compounds as well. In order to maintain a high alkalinity, several approaches were studied with the most promising being the use of trisodium phosphate. The trisodium phosphate provided a stable high pH>11. The high alkalinity, in addition to providing an optimum stable environment for the permanganate ion, also serves to be a good reagent for acid gas removal via neutralization and salt formation. By employing the sodium salts of the above compounds one can obtain high solubilities as well as maintaining a hygroscopic reagent package.

The choice of this buffer is quite critical since it is imperative that the pH of the permanganate ion does not rise too high or a second less desirable series of reactions takes place. The first occurs with the permanganate ion at very high pHs where it is converted to a less reactive and less stable manganate ion. Manganate ion upon a slight pH lowering (as carbon dioxide solvolyzes in water), will disproportionate into manganese dioxide and permanganate ion, thus losing a portion of its oxidation power. Recall, when permanganate ion is consumed in an oxidation, hydroxide ion is formed, resulting in raising the pH. This swing of pH resulting from hydroxide formation and manganate formation and degradation results in very rapid cycling and rapid decomposition of the permanganate ion under normal conditions. This is in part the cause for the belief that highly alkaline potassium permanganate solutions are not stable, beyond their light sensitivity. It has been found that the sodium salts of permanganate along with the lower pH and buffering nature of the trisodium phosphate maintains a stable high pH while still low enough to prevent the conversion of permanganate to manganate. Replacement of the sodium cations for the potassium cations is also critical, since it inhibits this conversion to the manganate ion. The choice of cation has been shown to have a dramatic effect on the manganate ion formation in the series of Li, Na, K, Rb and Cs.

Figure 11:
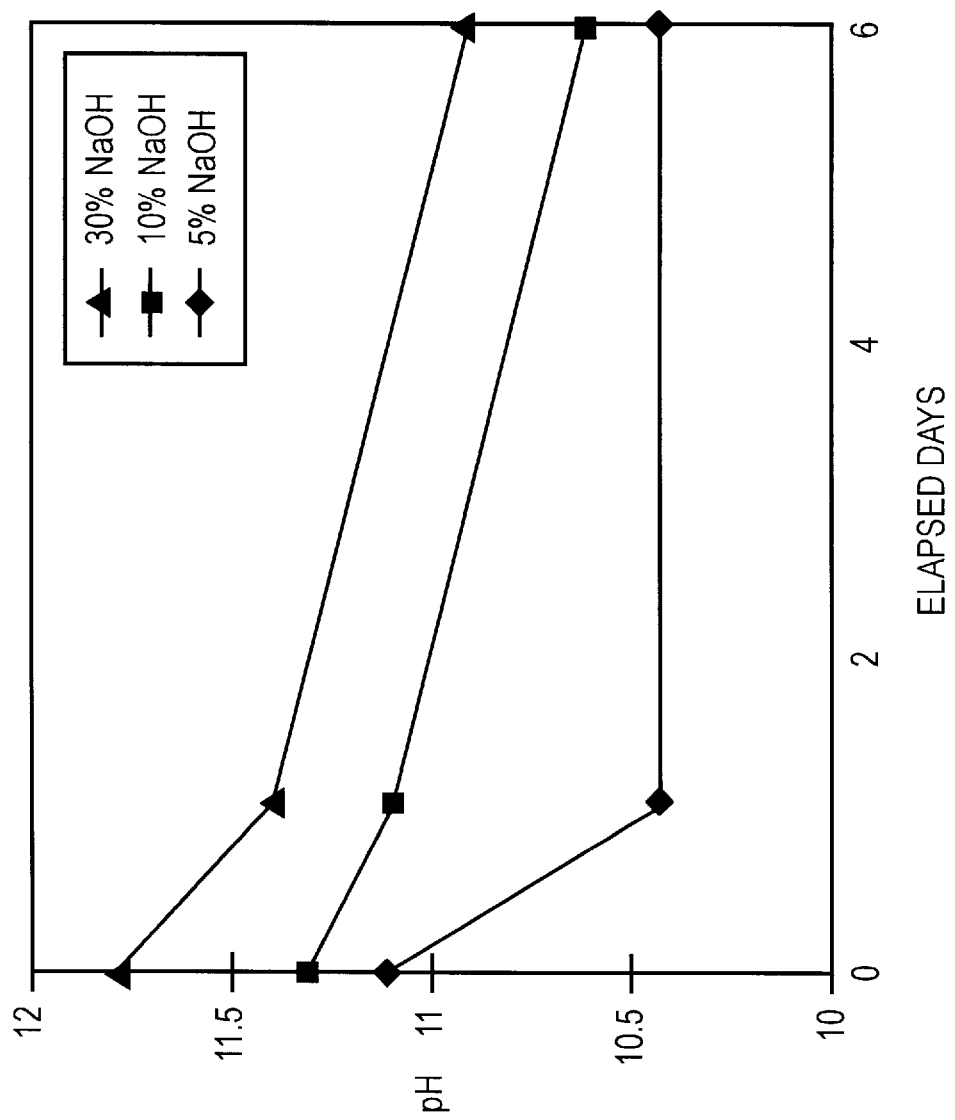

Furthermore, it is a difficult task to maintain a stable high pH due to the reaction of carbon dioxide in the air neutralizing excess hydroxide ions. Highly alkaline solutions made from group I metal hydroxides are well known to be scavengers for carbon dioxide. We have found a wealth of published data along with our own experiences that describes the instability of sodium or potassium hydroxide either in supported forms or in water when in the presence of air. FIG. 11 shows the gradual and rapid decrease in pH of aqueous hydroxide solutions which are being neutralized by carbon dioxide in only 6 days. The sodium hydroxide on a sodium hydroxide impregnated carbon will also react readily with the atmospheric carbon dioxide and the effective alkalinity will be diminished. This effect will result in reduced breakthrough performance for gases which are more effectively removed in stronger alkaline environments.

We have experimented with many approaches to find the appropriate pH and ways to maintain it. The challenge is to balance the three opposing forces; 1) degradation by the carbon dioxide in the air if the pH is too high, 2) pH low enough to prevent manganate formation and 3) the higher the pH the more rapid the oxidation. A trisodium phosphate solution was found to be able to maintain very high pH's over long periods of time without subsequent manganate formation while still high enough to obtain rapid oxidation.

The other role the trisodium phosphate serves is to buffer the pH for excursions resulting from carbon dioxide and hydroxide generation during permanganate reduction. The mechanism of permanganate oxidation results in the generation of hydroxide ion during this reaction. This in situ hydroxide formation needs to be buffered so that very high pH excursions are dampened out. However, this hydroxide formation has value as an additional source of deliquescing agent to maintain water levels. Sodium hydroxide has a deliquescent RH of 10–15%.

A further task is to try to maintain an active environment in which the permanganate ion can function in an aqueous soluble form unlike some conventional permanganate systems which rely on essentially dry impregnated potassium permanganate supported on some high surface area ceramic. A soluble permanganate should have a much faster oxidization rate than a solid phase permanganate oxidation and be less subject to product poisoning. The reaction product of permanganate oxidation is manganese dioxide which is insoluble. This insoluble oxide forms a tenacious brown coating which can form a kinetic barrier for further reaction by poisoning the surface of the solid oxidant. Despite the desirable catalytic oxidation ability of the manganese dioxide it does not compensate for the barrier it provides for the remainder of the permanganate ion. Therefore a soluble, molecularly mobile environment encourages refluxing and dispersion of the manganese dioxide. The manganese dioxide forms a colloidal dispersion and its reactivity and disperability are very much dependent upon the environment in which it is produced. A high ionic strength environment as provided by a highly charged ion like phosphate aids in this dispersion.

EXAMPLE 1

Breakthrough Analysis

Figure 6:
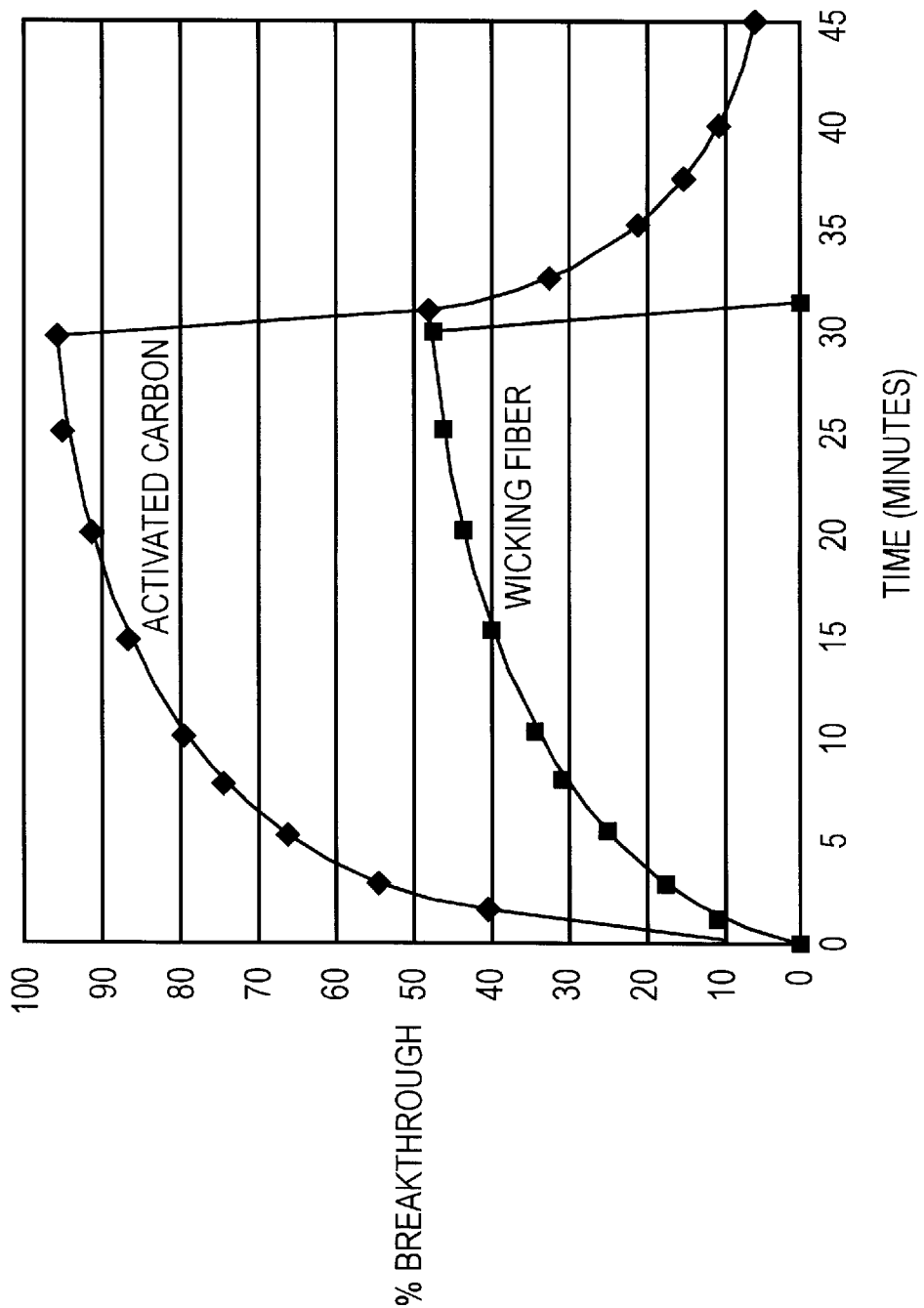
FIG. 6 is a graph showing the comparative results of acetaldehyde breakthrough performance for an activated carbon filter vs. an impregnated wicking fiber filter according to the present invention.
Figure 7:
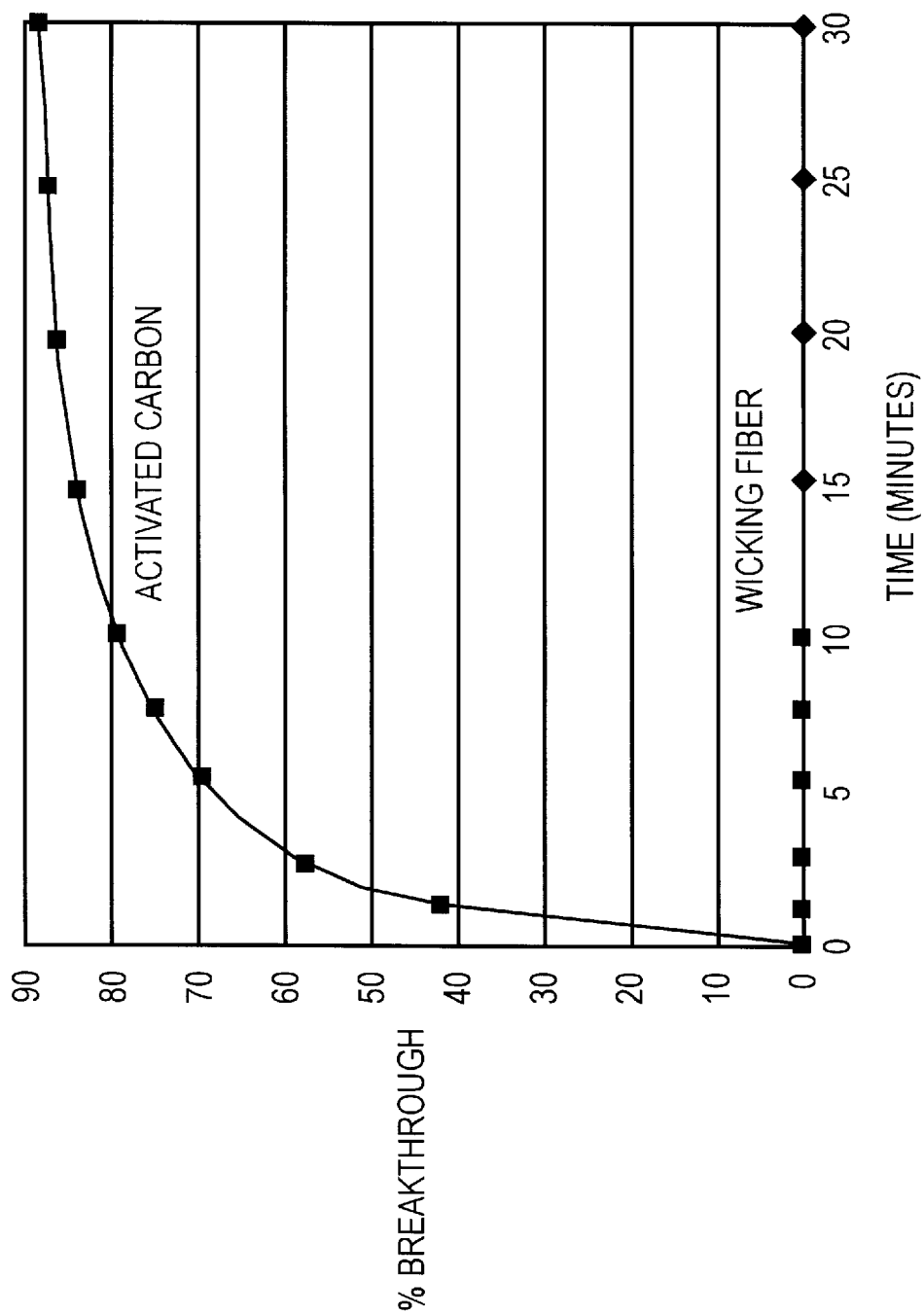
FIG. 7 is a graph showing the comparative results of hydrogen sulfide breakthrough performance for an activated carbon filter vs. an impregnated wicking fiber filter according to the present invention.
Figure 8:
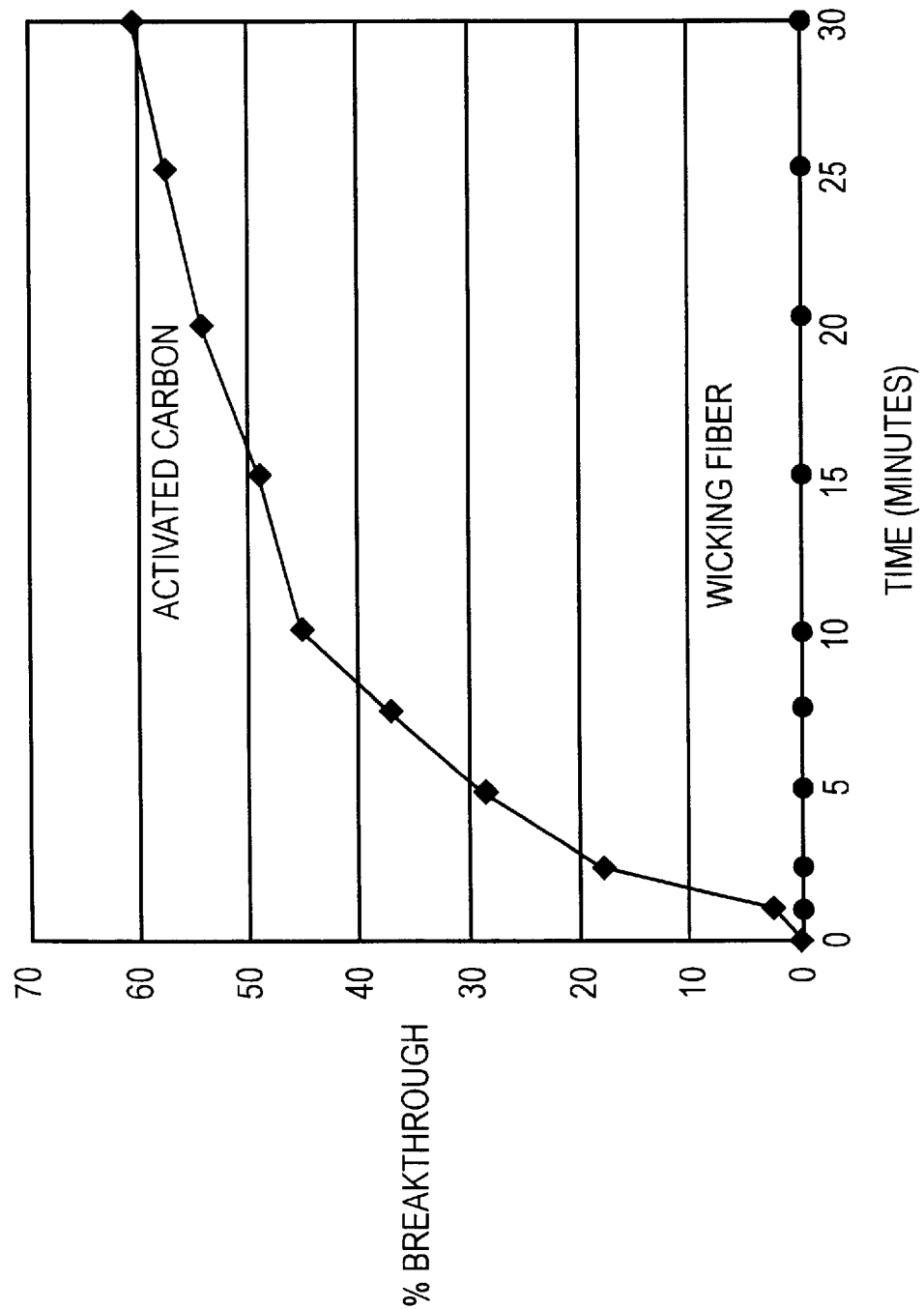
FIG. 8 is a graph showing the comparative results of sulfur dioxide breakthrough performance for an activated carbon filter vs. an impregnated wicking fiber filter according to the present invention.

Comparative uptake performance analysis of impregnated wicking fiber media 12 relative to activated carbon for acetaldehyde, hydrogen sulfide and sulfur dioxide are shown in FIGS. 6, 7 and 8. The chemical reagent package which was wicked into the fiber was prepared from an aqueous solution consisting of 15% by weight of sodium permanganate and trisodium phosphate in water.

These gases were chosen as representative of only a partial list of the various different chemical classes of gases which one might encounter in air quality applications. In order to rapidly measure the uptake capability of these filters, a high gas challenge level was employed, higher than one would normally experience under real world conditions.

The activated carbon tested in these studies was obtained commercially. Carbon filters of this type are currently used for cabin air treatment in automotive applications. The wicking fiber media 12 were impregnated with a reagent package 18 effective for all three gases. The impregnated wicking fiber media 12 were approximately 1.5 mm thick, and the activated carbon material was about 6.3 mm thick. The volume occupied by the activated carbon was, therefore, about 4.2 times that of the wicking fiber media 12. Because of the thicker carbon bed, the time spent within the activated carbon by the challenge gas is approximately 4 times longer than in the wicking fiber media 12, at a given gas velocity.

FIG. 6 shows the percent breakthrough of acetaldehyde in the effluent air of impregnated wicking fiber media 12 and activated carbon as a function of time after the start of challenge. The subject media were challenged with 50 ppm acetaldehyde in air at a face velocity of 12.2 m/min at 50±5% relative humidity. The amount of acetaldehyde in the effluent air stream was quantitated using total hydrocarbon analysis, and plotted vs. time. The challenge gas flow rate in these studies was 14.2 l/min, or about 12.2 m/min face velocity. The impregnated wicking fiber 12 demonstrated good acetaldehyde uptake out to the 30 minute duration of the study. Despite the longer contact time, however, the carbon media initially rejected nearly half the challenge acetaldehyde, and was essentially depleted by 30 minutes after the start of challenge. In this study, acetaldehyde challenge was terminated at 30 minutes, and the hydrocarbon content in the effluent gas was measured for an additional 15 minutes—from minute 30 to minute 45 in FIG. 6. Considerable hydrocarbon was detected in the effluent gas of the activated carbon for the 15 minutes post-challenge, indicating that off gassing of the adsorbed acetaldehyde had occurred. By contrast, however, the hydrocarbon level in the effluent gas of the wicking fiber media 12 had fallen to essentially zero within one minute post-challenge. This confirms that the uptake of acetaldehyde by the impregnated wicking fiber media 12 is an irreversible phenomenon.

FIG. 7 compares the relative performance of the impregnated wicking fiber media 12 with that of activated carbon for the removal of hydrogen sulfide. The hydrogen sulfide challenge was 10 ppm, at a face velocity of 12.2 m/min at 50±5% relative humidity. Hydrogen sulfide was quantitated in the effluent air stream by flame photometric detection, and plotted vs. time. The results indicate that the impregnated wicking fiber 12 is capable of superior performance, when compared to the activated carbon media. The concentration of hydrogen sulfide in the effluent air of the wicking fiber media was below the detectable limit for the entire 30 minute duration of the test. Initial rejection of hydrogen sulfide by the activated carbon was high, and by 10 minutes after challenge initiation, the effluent concentration had risen to nearly 80% of the challenge level.

The relative sulfur dioxide uptake performance of impregnated wicking fiber 12 and activated carbon media are shown in FIG. 8. The sulfur dioxide challenge level in these studies was 8 ppm, and at a gas face velocity of 12.2 m/min at 50±5% relative humidity. Sulfur dioxide was quantitated in the effluent air stream by flame photometric detection, and plotted vs. time. The impregnated wicking fiber media 12 removed sulfur dioxide to below the detectable limit for the 30 minute duration of the test. Rejection of sulfur dioxide by the activated carbon media was high, and after 15 minutes, nearly 50% breakthrough was observed.

Figure 9:
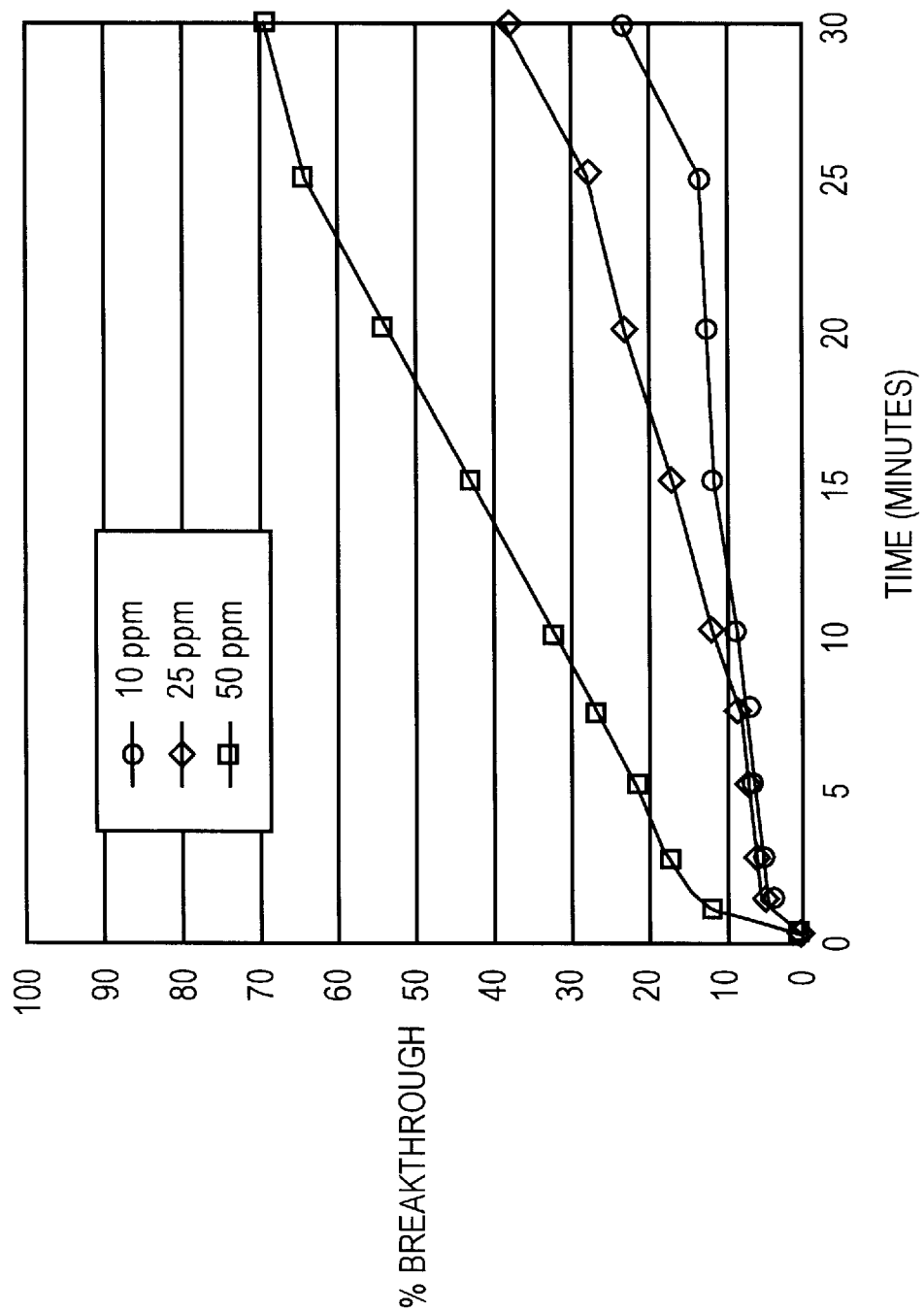
FIG. 9 is a graph showing the effect of acetaldehyde concentration in the challenge air stream on breakthrough performance of a impregnated wicking fiber filter.

FIG. 9 shows how acetaldehyde breakthrough characteristics vary as a function of acetaldehyde challenge level. In these studies, impregnated wicking fibers 12 were challenged with 10 ppm, 25 ppm or 50 ppm acetaldehyde at a gas face velocity of 12.2 m/min at 50±5% relative humidity. Acetaldehyde in the effluent was quantitated by total hydrocarbon analysis, and plotted vs. time. The results presented in FIG. 9 indicate that as the acetaldehyde challenge level is decreased, a much greater percentage of the challenge acetaldehyde is removed by the impregnated wicking fibers 12. Extrapolation of this challenge/performance relationship to acetaldehyde levels expected in most environments, <5 ppm, would predict that the impregnated wicking fiber media 12 will afford very effective protection at more realistic acetaldehyde exposure levels.

EXAMPLE 2

Stability of Preferred Reagent Package

Stability of reagents is an important consideration, given the reactive nature of the preferred reagent package. In order to gauge stability and predict long term performance, media impregnated with sodium permanganate and trisodium phosphate were prepared and placed outdoors in a location subjected to typical odors. The media were periodically sampled and its performance and chemical composition were monitored over a period of several months. This study is ongoing, and will be terminated at the end of one year.

Figure 10:
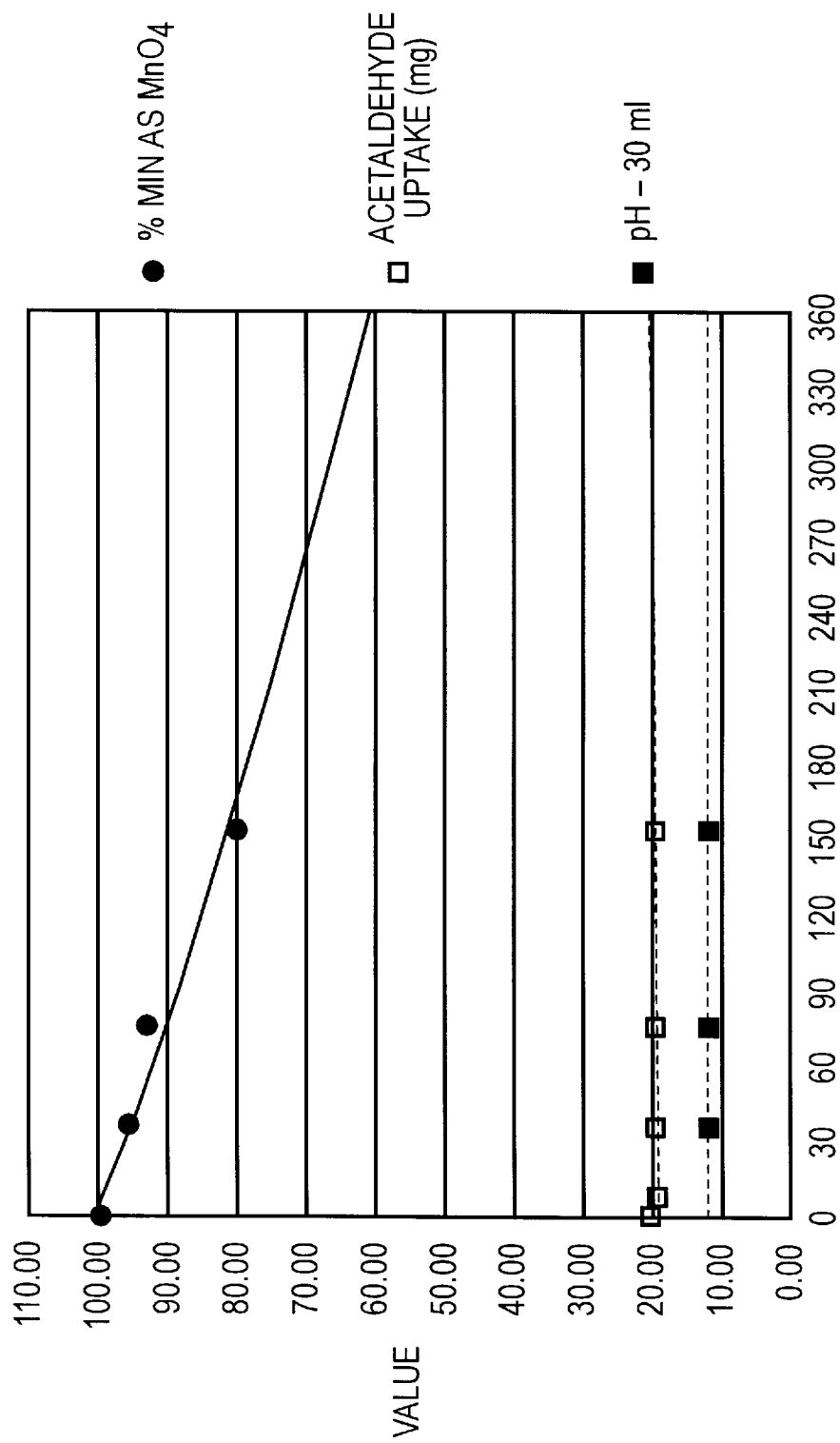
FIG. 10 is a graph showing the effects of outdoor aging on permanganate, pH and acetaldehyde uptake performance in an impregnated wicking fiber filter; and, FIG. 11 is a graph showing the change of pH of sodium hydroxide solution on fiber upon exposure to air.

The data presented in FIG. 10 show the effects of 5 months of outdoor aging on acetaldehyde uptake performance, pH and percent of total manganese still present in the highly reactive permanganate ($MnO_4^-$) state. The remaining manganese was found as manganese dioxide ($MnO_2$). First order exponential extrapolation of the data indicate that full activity, in terms of acetaldehyde uptake, should be maintained over an entire year. Likewise, the pH has remained virtually unchanged, pH (11.5–12), over the 5 month study period. The percent of manganese remaining in the permanganate state is undergoing an exponential decay, but this degradation has resulted in no measurable decrease in acetaldehyde uptake. Additionally, it is interesting to note that the conversion of permanganate to manganese dioxide does not appear to harm or restrict the ability of the permanganate to oxidize gases. It appears, therefore, that although the permanganate is being slowly consumed by the odors to which it comes in contact, it nonetheless retains adequate stability to qualify for air filter applications.

The method of operation and the apparatus of this invention should now be clear. Undesirable air borne odor contaminants are removed from an air stream by interposing a plurality of at least partially hollow wicking fibers 20 in the air stream. The hollow portions 22 of the wicking fibers contain a liquid 18, including a component, which can be sodium permanganate and trisodium phosphate, having an affinity for the undesirable odor molecules, which communicates with the air stream through an opening 24. The undesirable odor molecules are absorbed by the liquid 18 within the wicking fibers 20. The undesirable odor molecules in solution within the liquid 18 are then conveyed from the cleaned air stream by a concentration factor induced molecular migration into a regenerating air stream.

The wicking fiber approach of the present invention has significant advantages over the use of dry activated carbon. The impregnated wicking fibers 20 can have an extremely high odor absorbing capacity, many times greater than activated carbon. The pressure drop across an air filter 10 is much smaller than the drop across an activated carbon filter for the same capacity and removal efficiency. The wicking fiber filter 10 can be impregnated with additional additives to the basic chemical reagent liquid package to remove a broader range of gases than activated carbon. Further, the wicking fiber odor filter system 10 will not deteriorate in a high humidity environment. The wicking fiber systems 10, operating in a steady state condition, provides for the continuous removal of selected gas molecules and does not require a pump or other device to move the gas absorbing liquid 18.

The chemisorptive wicking fiber filter 12 has odor reducing properties superior to granular activated carbon. Additionally activated carbon's performance declines rapidly at higher relative humidities. The disclosed chemical formulation has properties which are improved when the relative humidities are higher. Additionally, prior art chemical reagent packages usually rely on solid coated substrate with their chemical package. This means that the reagent package is in the dry state. Typically dry reagents have slower kinetics than liquid based reagents. We have found a chemical composition liquid 18 including sodium permanganate in combination with either sodium carbonate or sodium phosphate has a wide and broad spectrum of effectiveness for odor removal. The odor absorbing liquid 18 can include specialized additives such as transition metal salts and other agents such as sodium iodide for additional and broader odor removal coverage.

The present invention is particularly suited to cabin air odor filtration. The disclosed invention provides a compact, economical air filter 10 for the nonmechanical, noncyclic, continuous removal of odor causing gas molecules which avoids the problems of reduced air flow rates and decreased molecule removal efficiency.

We claim:

1. A device for continuously removing undesirable odor vapors from a first air stream and releasing them into a second air stream comprising:
    a plurality of wicking fibers each including a longitudinally extending channel with a longitudinally extending opening;
    a liquid composition including sodium permanganate having an affinity for the undesirable odor vapors disposed within the channels of said plurality of wicking fibers;
    means for directing the first air stream across a part of said plurality of wicking fibers into contact with said liquid along said longitudinally extending openings whereby said liquid absorbs the undesirable odor vapors; and,
    said plurality of wicking fibers disposed to extend from the first air stream into the second air stream which strips away the undesirable odor vapors.

2. A device as claimed in claim 1 wherein said liquid composition includes sodium permanganate in combination with either sodium carbonate, trisodium phosphate or sodium phosphate.

3. A device as claimed in claim 1 wherein said liquid composition includes specialized additives optionally including transition metal salts or other agents optionally including sodium iodide for additional odor removal coverage.

4. Apparatus for removing molecules which cause undesired odors from a fluid stream comprising:
    a plurality of elongated fibers each having a longitudinally extending internal cavity including an elongated opening from the internal cavity to the outer fiber surface;
    a liquid composition including sodium permanganate in combination with either sodium carbonate or sodium phosphate which can absorb the molecules disposed within the internal cavities of said plurality of elongated fibers; and,
    a flow path for the fluid stream, containing the molecules to be removed, directed over a portion of said plurality of elongated fibers into contact with said liquid along said elongated openings whereby the molecules to be removed are absorbed by said liquid.

5. Apparatus as claimed in claim 4 wherein the longitudinally extending internal cavity in each of said plurality of elongated fibers is sized so that said liquid is retained within the cavity by capillary forces.

6. Apparatus as claimed in claim 4 comprising:
    regenerating means for removing the absorbed molecules from said liquid at a position on said plurality of elongated fibers displaced from said flow path; and wherein,
        the molecules to be removed which are absorbed by said liquid are moved from said flow path to said regenerating means by a concentration factor induced molecular migration which effectively conveys the absorbed molecules away from the fluid stream.

7. Apparatus as claimed in claim 4 wherein the fluid stream is air.

8. Apparatus as claimed in claim 4 wherein a plurality of internal cavities, each including an opening to the outer fiber surface, are formed in each fiber.

9. Apparatus as claimed in claim 4 wherein said liquid composition includes specialized additives optionally including transition metal salts for additional odor removal coverage.

10. A device as claimed in claim 4 wherein said liquid composition includes other agents optionally including sodium iodide for additional odor removal coverage.

11. A filter for removing a selected type of odor molecules from an air stream comprising:
    a plurality of elongated fibers, each having an elongated open channel extending into the interior of the fiber, disposed to form a fiber filter mat; and,
    a liquid composition, including sodium permanganate in combination with sodium carbonate, trisodium phosphate or sodium phosphate, which has an affinity for the selected type of odor molecules disposed within the channels and having an exposed portion near the exterior of the fiber for absorbing the selected types of odor molecules as the air stream passes through the filter and into contact with said liquid composition which is retained with in the channels.

12. A filter as claimed in claim 11 wherein each fiber includes a plurality of elongated open channels within which the liquid which can absorb the selected type of odor molecules is disposed.

13. A device as claimed in claim 11 wherein said liquid composition includes specialized additives optionally including transition metal salts for additional odor removal coverage.

14. A device as claimed in claim 11 wherein said liquid composition includes other agents optionally including sodium iodide for additional odor removal coverage.

15. A method for continuously removing specific type of odor causing molecules from an air stream comprising the steps of:

a. selecting a liquid composition including sodium permanganate which has an affinity for the specific type of odor causing molecules to be removed;

b. placing the selected liquid composition on a mat formed from a plurality of wicking fibers which have the ability to move the selected liquid along their surface yet retain the selected liquid within longitudinally extending channels having longitudinally extending openings against moving into the space between the individual wicking fibers; and, c. directing the air stream through a portion of the mat into contact with the selected liquid along the longitudinally extending openings whereby the selected liquid absorbs the specific type of odor causing molecules.

16. A method as claimed in claim 15 including the additional step of:

d. directing a stripping fluid stream through a different portion of the mat so that the specific type of odor causing molecules, which have been absorbed by and disbursed through out the selected liquid, are stripped away.

17. A method as claimed in claim 16 wherein the liquid composition selected in step a is used in combination with sodium carbonate.

18. A method as claimed in claim 16 wherein the liquid composition selected in step a is used in combination with sodium phosphate.

19. A method as claimed in claim 16 wherein said liquid composition includes specialized additives optionally including transition metal salts for additional odor removal coverage.

20. A method as claimed in claim 16 wherein said liquid composition includes other agents optionally including sodium iodide for additional odor removal coverage.

* * * * *